(12) United States Patent
Wither et al.

(10) Patent No.: US 8,930,141 B2
(45) Date of Patent: Jan. 6, 2015

(54) APPARATUS, METHOD AND COMPUTER PROGRAM FOR DISPLAYING POINTS OF INTEREST

(75) Inventors: Jason Robert Wither, San Jose, CA (US); Ray William Rischpater, Boulder Creek, CA (US); Carmen Esther Au, Menlo Park, CA (US); Petri Piippo, Lempaala (FI); Tuomas Vaittinen, Helsinki (FI); David Racz, Palo Alto, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/489,927

(22) Filed: Jun. 6, 2012

(65) Prior Publication Data

US 2013/0173154 A1    Jul. 4, 2013

Related U.S. Application Data

(63) Continuation-in-part of application No. 13/340,995, filed on Dec. 30, 2011.

(51) Int. Cl.
*G01C 21/36* (2006.01)

(52) U.S. Cl.
CPC ........ *G01C 21/3635* (2013.01); *G01C 21/3667* (2013.01)
USPC ...................................... 701/532; 340/995.1

(58) Field of Classification Search
CPC ........... G01C 21/3635; G01C 21/3682; G01C 21/3679; G01C 21/3667; G01C 21/367
USPC ............................ 701/532; 340/995.1, 995.15
See application file for complete search history.

(56) References Cited

U.S. PATENT DOCUMENTS

| | | | |
|---|---|---|---|
| 6,078,865 A | 6/2000 | Koyanagi | 701/211 |
| 6,199,014 B1 | 3/2001 | Walker et al. | 701/211 |
| 6,336,073 B1 | 1/2002 | Ihara et al. | 701/533 |
| 6,498,620 B2 | 12/2002 | Schofield et al. | 348/148 |
| 6,510,379 B1 | 1/2003 | Hasegawa et al. | 701/202 |
| 6,640,185 B2 * | 10/2003 | Yokota et al. | 701/455 |
| 6,859,723 B2 * | 2/2005 | Yokota | 701/532 |
| 6,898,516 B2 | 5/2005 | Pechatnikov et al. | 701/209 |
| 7,587,276 B2 | 9/2009 | Gold et al. | 701/426 |
| 8,000,892 B2 | 8/2011 | Banerjee | 701/202 |

(Continued)

FOREIGN PATENT DOCUMENTS

| | | |
|---|---|---|
| EP | 1508780 A1 | 2/2005 |
| EP | 1 614 997 A1 | 1/2006 |

OTHER PUBLICATIONS

Kolbe et al., "Augmented Videos and Panoramas for Pedestrian Navigation", (2004), (10 pages).

(Continued)

*Primary Examiner* — Tuan C. To
(74) *Attorney, Agent, or Firm* — Harrington & Smith

(57) ABSTRACT

An apparatus, method, computer program and user interface where the apparatus includes at least one processor; and at least one memory including computer program code; wherein the at least one memory and the computer program code are configured to, with the at least one processor, enable the apparatus to: display a perspective view of a geographical location at a first scale in a first region of a display; identify a point of interest associated with the geographical location; and display the identified point of interest at a second scale in a second region of the display.

20 Claims, 10 Drawing Sheets

(56) References Cited

U.S. PATENT DOCUMENTS

| | | | | |
|---|---|---|---|---|
| 8,566,029 | B1* | 10/2013 | Lopatenko et al. | 701/426 |
| 2001/0019309 | A1 | 9/2001 | Saeki et al. | 340/995 |
| 2002/0065605 | A1* | 5/2002 | Yokota | 701/211 |
| 2005/0073443 | A1* | 4/2005 | Sheha et al. | 340/995.1 |
| 2005/0107949 | A1 | 5/2005 | Yokota | 701/209 |
| 2005/0270311 | A1 | 12/2005 | Rasmussen et al. | 345/677 |
| 2006/0074553 | A1 | 4/2006 | Foo et al. | 701/212 |
| 2006/0129316 | A1 | 6/2006 | Park | 701/211 |
| 2006/0271287 | A1 | 11/2006 | Gold et al. | 701/211 |
| 2007/0073475 | A1 | 3/2007 | Endo | 701/207 |
| 2007/0078596 | A1 | 4/2007 | Grace | 701/209 |
| 2007/0139411 | A1 | 6/2007 | Jawerth et al. | 345/440 |
| 2007/0233369 | A1 | 10/2007 | Ng et al. | 701/208 |
| 2007/0271035 | A1 | 11/2007 | Stoschek et al. | 701/209 |
| 2008/0065322 | A1 | 3/2008 | Ng et al. | 701/209 |
| 2008/0133132 | A1 | 6/2008 | Jung et al. | 701/212 |
| 2008/0249703 | A1 | 10/2008 | Matsuno et al. | 701/201 |
| 2008/0312819 | A1 | 12/2008 | Banerjee | 701/202 |
| 2008/0319658 | A1 | 12/2008 | Horvitz et al. | 701/210 |
| 2009/0005973 | A1 | 1/2009 | Sale et al. | 701/209 |
| 2009/0063040 | A1* | 3/2009 | Schliermann | 701/209 |
| 2009/0157294 | A1 | 6/2009 | Geelen et al. | 701/200 |
| 2009/0187333 | A1 | 7/2009 | Mueller | 701/200 |
| 2009/0319166 | A1 | 12/2009 | Khosravy et al. | 701/200 |
| 2010/0017112 | A1* | 1/2010 | Sim | 701/201 |
| 2010/0094534 | A1 | 4/2010 | Naick et al. | 701/200 |
| 2010/0106411 | A1 | 4/2010 | Nirhamo et al. | 701/209 |
| 2010/0123737 | A1 | 5/2010 | Williamson et al. | 345/672 |
| 2010/0211284 | A1 | 8/2010 | Rothschild | 701/93 |
| 2010/0217525 | A1 | 8/2010 | King et al. | 701/300 |
| 2010/0235078 | A1 | 9/2010 | Chen et al. | 701/200 |
| 2010/0241347 | A1 | 9/2010 | King et al. | 701/201 |
| 2010/0250126 | A1 | 9/2010 | Epshtein et al. | 701/209 |
| 2011/0004401 | A1 | 1/2011 | Rothschild | 701/201 |
| 2011/0032145 | A1 | 2/2011 | Hansen et al. | 342/357.34 |
| 2011/0071757 | A1* | 3/2011 | Lee et al. | 701/208 |
| 2011/0071758 | A1 | 3/2011 | Cho et al. | 701/211 |
| 2011/0106427 | A1* | 5/2011 | Kim et al. | 701/201 |
| 2011/0106534 | A1 | 5/2011 | LeBeau et al. | 704/235 |
| 2011/0112756 | A1 | 5/2011 | Winkler et al. | 701/201 |
| 2011/0140928 | A1 | 6/2011 | Ren et al. | 340/995.14 |
| 2011/0144909 | A1 | 6/2011 | Ren et al. | 701/212 |
| 2011/0172906 | A1 | 7/2011 | Das et al. | 701/201 |
| 2011/0178697 | A1 | 7/2011 | Mincey et al. | 701/200 |
| 2011/0279445 | A1 | 11/2011 | Murphy et al. | 345/419 |
| 2011/0283223 | A1 | 11/2011 | Vaittinen et al. | 715/781 |
| 2011/0313653 | A1 | 12/2011 | Lindner | 701/201 |
| 2012/0046861 | A1* | 2/2012 | Feldbauer | 701/426 |
| 2013/0046738 | A1* | 2/2013 | Kuo et al. | 707/690 |
| 2013/0090845 | A1* | 4/2013 | Wakayanagi et al. | 701/411 |
| 2013/0138343 | A1* | 5/2013 | Choi | 701/527 |
| 2013/0155181 | A1* | 6/2013 | Williams et al. | 348/36 |
| 2013/0173156 | A1 | 7/2013 | Wither et al. | 701/533 |
| 2013/0211719 | A1* | 8/2013 | Boschker et al. | 701/533 |
| 2013/0212509 | A1* | 8/2013 | Van Seggelen et al. | 715/771 |

OTHER PUBLICATIONS

Cockburn, et al., "A Review of Overview + Detail, Zooming, and Focus + Context Interfaces", (2007), (42 pages).

Beeharee, et al., "A Natural Wayfinding- Exploiting Photos in Pedestrian Navigation Systems", (2006), (pp. 81-88).

Winter, et al., "9 Focalizing Measures of Salience for Wayfinding", Department of Geomatics, TheUniversity of Melbourne, (2005), (pp. 125-139).

"Microsoft Research Street Slide View", 2010). http://www.youtube.com/watch?v=ktdhOv8E51o, (2 pages), (Jul. 26, 2010).

Bogdhan, J. et al., "Using 3D Urgan Models for Pedestrian Navigation Support", © Navigon AG, 7 pgs.

Google Maps India, "India gets 'landmarks' on Google Map", Dec. 17, 2009, 3 pgs.

Duckham, M., et al., "Including Landmarks in Routing Instructions", Journal of Location Based Services, Mar. 12, 2010, 20 pgs.

Hile, H. et al., "Landmark-Based Pedestrian Navigation with Enhanced Spatial Reasoning", 18 pgs.

Google Maps India, "India gets 'landmarks' on Google Map",'Dec. 17, 2009, 3 pgs.

Millonig, A., et al., "Developing Landmark-Based Pedestrian-Navigation Systems", © 2007 IEEE, 7 pgs.

Duckham, M., et el, "Including Landmarks in Routing Instructions", Journal of Location Based Services, Mar. 12, 2010, 20 pgs.

Michon et al., "When and Why are Visual Landmarks Used in Giving Directions", (2001), (pp. 292-305).

Tom, et al., "Referring to Landmark or Street Information in Route Directions: What Difference Does it Make", (2003), (pp. 362-374).

* cited by examiner

APPARATUS, METHOD AND COMPUTER PROGRAM FOR DISPLAYING POINTS OF INTEREST

CROSS-REFERENCE TO A RELATED PATENT APPLICATION

This patent application is a continuation-in-part of U.S. patent application Ser. No. 13/340,995, filed Dec. 30, 2011 which is hereby incorporated by reference in its entirety.

TECHNOLOGICAL FIELD

Embodiments of the present disclosure relate to an apparatus, method and computer program for displaying points of interest. In particular, they relate to an apparatus, method and computer program for displaying points of interest along a route between a first geographical location and a second geographical location.

BACKGROUND

Apparatus such as a global positioning system (GPS) device or a navigation device are known. Such apparatus provide directions that enable a user to follow a route from a first geographical location to a second geographical location. It is useful to provide such instructions in a manner that is clear and easy for the user to follow whilst they are driving or walking.

BRIEF SUMMARY

According to various, but not necessarily all, embodiments of the disclosure there may be provided an apparatus comprising: at least one processor; and at least one memory including computer program code; wherein the at least one memory and the computer program code are configured to, with the at least one processor, enable the apparatus to: display a perspective view of a geographical location at a first scale in a first region of a display; identify a point of interest associated with the geographical location; and display the identified point of interest at a second scale in a second region of the display.

In some embodiments identifying a point of interest may comprise selecting a point of interest from a plurality of available points of interest.

In some embodiments identifying the point of interest may comprise using a weighting algorithm to determine a point of interest relevant to a user of the apparatus. The weighting algorithm may use previous activity by the user of the apparatus to determine a point of interest relevant to a user of the apparatus.

In some embodiments the point of interest may be identified automatically.

In some embodiments the point of interest may comprise at least one alphanumeric character.

In some embodiments the second scale may be larger than the first scale.

In some embodiments the identified point of interest may be displayed in perspective view of a geographical location at a first scale in a first region of a display and at a second scale in a second region of the display.

In some embodiments an indicator may be displayed to indicate the location of the identified point of interest relative to the perspective view.

According to various, but not necessarily all, embodiments of the disclosure there may be provided a method comprising: displaying a perspective view of a geographical location at a first scale in a first region of a display; identifying a point of interest associated with the geographical location; and displaying the identified point of interest at a second scale in a second region of the display.

In some embodiments identifying a point of interest may comprise selecting a point of interest from a plurality of available points of interest.

In some embodiments identifying the point of interest may comprise using a weighting algorithm to determine a point of interest relevant to a user of the apparatus. The weighting algorithm may use previous activity by the user of the apparatus to determine a point of interest relevant to a user of the apparatus.

In some embodiments the point of interest may be identified automatically.

In some embodiments the point of interest may comprise at least one alphanumeric character.

In some embodiments the second scale may be larger than the first scale.

In some embodiments the identified point of interest may be displayed in perspective view of a geographical location at a first scale in a first region of a display and at a second scale in a second region of the display.

In some embodiments an indicator may be displayed to indicate the location of the identified point of interest relative to the perspective view.

According to various, but not necessarily all, embodiments of the disclosure there may be provided a computer program comprising computer program instructions that, when executed by at least one processor, cause an apparatus at least to perform: displaying a perspective view of a geographical location at a first scale in a first region of a display; identifying a point of interest associated with the geographical location; and displaying the identified point of interest at a second scale in a second region of the display.

In some embodiments there may be provided a computer program comprising program instructions for causing a computer to perform any of the methods described above.

In some embodiments there may be provided a physical entity embodying any of the computer programs as described above.

In some embodiments there may be provided an electromagnetic carrier signal carrying any of the computer programs as described above.

According to various, but not necessarily all, embodiments of the disclosure there is provided an apparatus comprising: at least one processor; and at least one memory including computer program code; wherein the at least one memory and the computer program code are configured to, with the at least one processor, enable the apparatus to: obtain a route from a first geographical location to a second geographical location; display a graphical representation of at least one point of interest along the route, wherein the graphical representation of the at least one point of interest is configured to enable a user to recognise the point of interest corresponding to the graphical representation of the at least one point of interest; and display an identification of the at least one point of interest.

In some embodiments the identification of the point of interest may comprise highlighting the point of interest.

In some embodiments the at least one memory and the computer program code may be further configured to, with the at least one processor, enable the apparatus to provide instructions to enable a user of the apparatus to follow the route from the first geographical location to the second geographical location wherein the instructions reference the at least one point of interest.

In some embodiments the at least one memory and the computer program code may be further configured to, with the at least one processor, enable the apparatus to display the graphical representation of the at least one point of interest in a first portion of a display and simultaneously display the instructions in a second portion of the display.

In some embodiments the at least one memory and the computer program code may be further configured to, with the at least one processor, enable the apparatus to display arrows indicative of the instructions.

In some embodiments the at least one memory and the computer program code may be further configured to, with the at least one processor, enable the apparatus to display a map comprising at least one icon associated with at least one point of interest and, in response to detecting selection of the icon, cause the graphical representation of at the least one point of interest to be displayed.

In some embodiments the graphical representation of the at least one point of interest may comprise a portion of a panoramic view of a geographical location.

In some embodiments the at least one memory and the computer program code may be further configured to, with the at least one processor, enable the apparatus to determine a perspective of a user and display the graphical representation of the at least one point of interest to correspond to the determined perspective of the user.

In some embodiments the perspective of the user may be determined from the route.

In some embodiments the at least one memory and the computer program code may be further configured to, with the at least one processor, enable the apparatus to obtain the route in response to a user input identifying at least an end location.

In some embodiments the at least one memory and the computer program code may be further configured to, with the at least one processor, enable the apparatus to obtain, in response to obtaining the route, information relating to points of interest along the route.

According to various, but not necessarily all, embodiments of the disclosure there is provided a method comprising: obtaining a route from a first geographical location to a second geographical location; displaying a graphical representation of at least one point of interest along the route, wherein the graphical representation of the at least one point of interest is configured to enable a user to recognise the point of interest corresponding to the graphical representation of the at least one point of interest; and displaying an identification of the at least one point of interest.

In some embodiments the identification of the point of interest may comprise highlighting the point of interest.

In some embodiments the method may also comprise providing instructions to enable a user of an apparatus to follow the route from the first geographical location to the second geographical location wherein the instructions reference the at least one point of interest.

In some embodiments the graphical representation of at least one point of interest may be displayed in a first portion of a display and the instructions may be simultaneously displayed in a second portion of the display.

In some embodiments the method may also comprise displaying arrows indicative of the instructions.

In some embodiments the method may also comprise displaying a map comprising at least one icon associated with at least one point of interest and, in response to detecting selection of the icon, causing the graphical representation of at the least one point of interest to be displayed.

In some embodiments the graphical representation of at least one point of interest may comprise a portion of a panoramic view of a geographical location.

In some embodiments the method may also comprise determining a perspective of a user and displaying the graphical representation of the at least one point of interest to correspond to the determined perspective of the user.

In some embodiments the perspective of the user may be determined from the route.

In some embodiments the route may be obtained in response to a user input identifying at least an end location.

In some embodiments, in response to obtaining the route, information relating to points of interest along the route may be obtained.

According to various, but not necessarily all, embodiments of the disclosure there may be provided a computer program comprising computer program instructions that, when executed by at least one processor, cause an apparatus at least to perform: obtaining a route from a first geographical location to a second geographical location; displaying a graphical representation of at least one point of interest along the route, wherein the graphical representation of the at least one point of interest is configured to enable a user to recognise the point of interest corresponding to the graphical representation of the at least one point of interest; and displaying an identification of the at least one point of interest.

In some embodiments there may be provided a computer program comprising program instructions for causing a computer to perform the method as described above.

In some embodiments there may be provided a physical entity embodying the computer program as described above.

In some embodiments there may be provided an electromagnetic carrier signal carrying the computer program as described above.

The apparatus may be for assisting navigation. The apparatus may also enable wireless communication.

BRIEF DESCRIPTION

For a better understanding of various examples of embodiments of the present disclosure reference will now be made by way of example only to the accompanying drawings in which.

DETAILED DESCRIPTION

Figure 1:
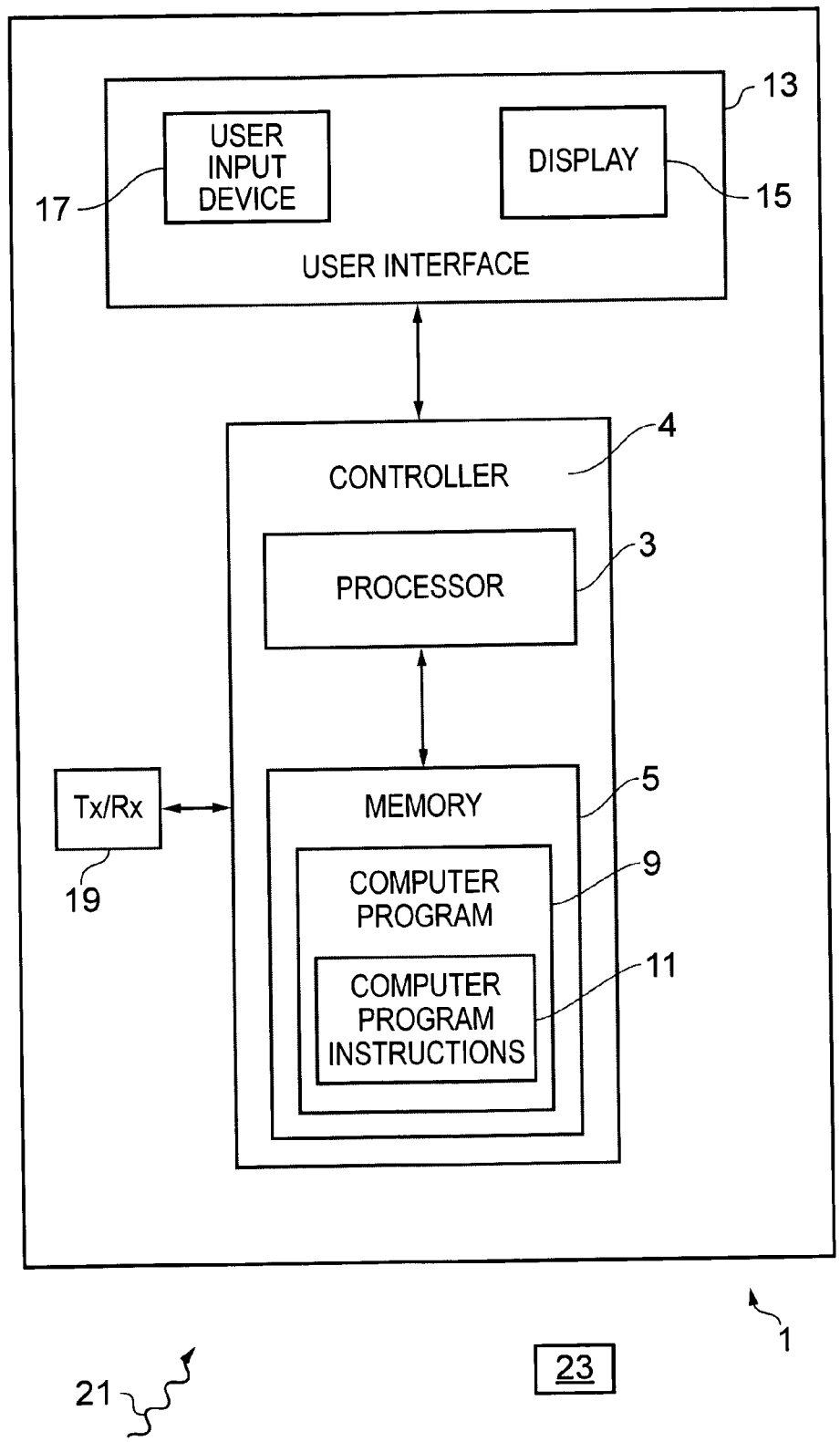
FIG. 1 illustrates an apparatus according to an exemplary embodiment.

The Figures illustrate an apparatus 1 comprising: at least one processor 3; and at least one memory 5 including computer program code 9; wherein the at least one memory 5 and the computer program code 9 are configured to, with the at least one processor 3, enable the apparatus 1 to: obtain a route 55 from a first geographical location to a second geographical location; display a graphical representation 65 of at least one point of interest along the route 55, wherein the graphical representation 65 of the at least one point of interest is configured to enable a user to recognise the point of interest corresponding to the graphical representation 65 of the at least one point of interest; and display an identification of the at least one point of interest.

FIG. 1 schematically illustrates an apparatus 1 according to an exemplary embodiment of the disclosure. The apparatus 1 may be an electronic apparatus. The apparatus 1 may be, for example, a mobile cellular telephone, a global positioning system (GPS) device or a navigation device, a tablet computer, a personal computer, a camera, a gaming device, a personal digital assistant, a personal music player or any other apparatus which may be configured to enable a user to access navigation applications. The apparatus 1 may be a handheld apparatus 1 which can be carried in a user's hand, handbag or pocket of their clothes for example.

The apparatus 1 illustrated in FIG. 1 comprises: a user interface 13, a controller 4 and a transceiver 19. In the illustrated embodiment the controller 4 comprises at least one processor 3 and at least one memory 5 and the user interface 13 comprises a display 15 and a user input device 17. In the illustrated embodiment the transceiver 19 is shown as a single entity. It would be appreciated by a person skilled in the art that the transceiver 19 may comprise one or more separate receivers and transmitters.

Only features referred to in the following description are illustrated in FIG. 1. However, it should be understood that the apparatus 1 may comprise additional features that are not illustrated. For example, in some embodiments the user interface 13 may comprise other user output devices such as a loudspeaker or other means for providing audio outputs to the user of the apparatus 1.

The controller 4 provides means for controlling the apparatus 1. The controller 4 may be implemented using instructions that enable hardware functionality, for example, by using executable computer program instructions 11 in one or more general-purpose or special-purpose processors 3 that may be stored on a computer readable storage medium 23 (e.g. disk, memory etc) to be executed by such processors 3. In some embodiments the computer readable storage medium 23 may be a part of the apparatus 1. In some embodiments the computer readable storage medium 23 may be a separate entity to the apparatus 1. In such embodiments the computer readable storage medium 23 may be removably coupled to the apparatus 1.

The controller 4 may be configured to control the apparatus 1 to perform a plurality of different functions. For example, the controller 4 may be configured to enable the apparatus 1 to access a navigation or positioning application. This may enable the apparatus 1 to determine the location of the apparatus 1 and provide directions and information relating to the determined location.

The controller 4 may also be configured to enable the apparatus 1 to obtain a route 55 from a first geographical location to a second geographical location; display a graphical representation 65 of at least one point of interest along the route 55, wherein the graphical representation 65 of the at least one point of interest is configured to enable a user to recognise the point of interest corresponding to the graphical representation 65 of the at least one point of interest; and display an identification of the at least one point of interest.

The at least one processor 3 may be configured to receive input commands from the user interface 13 and also to provide output commands to the user interface 13. The at least one processor 3 is also configured to write to and read from the at least one memory 5. Outputs of the user interface 13 are provided as inputs to the controller 4.

The display 15 may comprise any means that enables information to be displayed to a user of the apparatus 1. The information which is displayed may comprise graphical user interfaces 41 such as those illustrated in FIGS. 4A to 4D. The display 15 may also be configured to display information such as maps or images such as photographs.

The information that is displayed on the display 15 may be stored in the one or more memories 5 and/or may be received by the transceiver 19.

The user input device 17 provides means for enabling a user of the apparatus 1 to input information that may be used to control the apparatus 1. The user input device 17 may also enable a user to input information which may be stored in the one or more memories 5 of the apparatus 1. The user input device 17 may comprise any means which enables a user to input information into the apparatus 1. For example the user input device 17 may comprise a touch sensitive display, a keypad, a hover input device or a combination of a number of different types of user input devices.

The apparatus 1 illustrated in FIG. 1 also comprises a transceiver 19. The transceiver 19 may comprise any means that enables the apparatus 1 to receive data from another apparatus or a communications network. In some embodiments of the disclosure the transceiver 19 may be configured to enable wireless communication. For example the transceiver 19 may be configured to enable the apparatus 1 to operate in a cellular communications network.

The transceiver 19 may be configured to enable the apparatus 1 to communicate with a positioning system such as a satellite navigation system for example GPS or enhanced GPS. This may enable the location of the apparatus 1 to be determined so that the apparatus 1 can provide the user with directions and other information based on the determined current location of the apparatus 1. The apparatus 1 may be configured to update information displayed on the display 15 in response to a detected change in the position of the apparatus 1.

The at least one memory 5 stores a computer program code 9 comprising computer program instructions 11 that control the operation of the apparatus 1 when loaded into the at least one processor 3. The computer program instructions 11 provide the logic and routines that enable the apparatus 1 to perform the methods illustrated in FIGS. 3A and 3B. The at least one processor 3 by reading the at least one memory 5 is able to load and execute the computer program 9.

The computer program instructions 11 may provide computer readable program means configured to control the apparatus 1. The program instructions 11 may provide, when loaded into the controller 4; means for obtaining a route 55 from a first geographical location to a second geographical location; displaying a graphical representation 65 of at least one point of interest along the route 55, wherein the graphical representation 65 of the at least one point of interest is configured to enable a user to recognise the point of interest corresponding to the graphical representation 65 of the at least one point of interest; and displaying an identification of the at least one point of interest.

The computer program code 9 may arrive at the apparatus 1 via any suitable delivery mechanism 21. The delivery mechanism 21 may be, for example, a computer-readable storage medium, a computer program product 23, a memory device, a record medium such as a CD-ROM or DVD, an article of manufacture that tangibly embodies the computer program code 9 or any other suitable mechanism. The delivery mechanism may be a signal configured to reliably transfer the computer program code 9. The apparatus 1 may propagate or transmit the computer program code 9 as a computer data signal.

Although the memory 5 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (e.g. Von Neumann)/parallel architectures but also specialized circuits such as field-programmable gate arrays (FPGA), application specific integration circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 2:
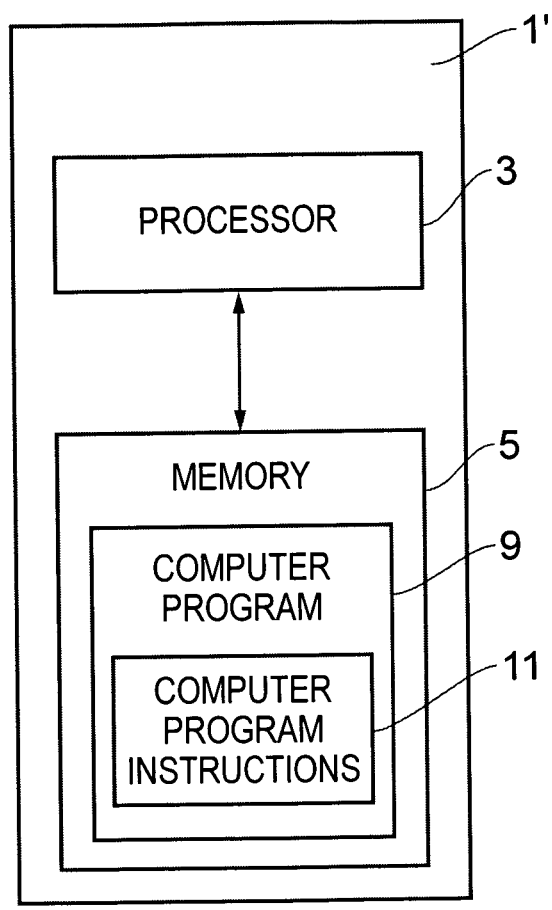
FIG. 2 illustrates an apparatus according to another exemplary embodiment.

FIG. 2 illustrates an apparatus 1' according to another embodiment of the disclosure. The apparatus 1' illustrated in FIG. 2 may be a chip or a chip-set. The apparatus 1' comprises at least one processor 3 and at least one memory 5 as described above in relation to FIG. 1.

Figure 3A:
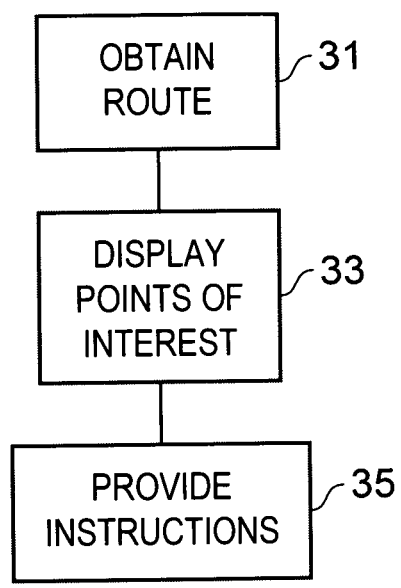
FIGS. 3A and 3B illustrate a method according to an exemplary embodiment.

FIG. 3A is a block diagram that schematically illustrates a method according to an embodiment of the disclosure. The method may be implemented by an apparatus such as the apparatus 1 illustrated in FIG. 1 or the apparatus 1' illustrated in FIG. 2. In some embodiments the graphical user interfaces illustrated in FIGS. 4A to 4D may be used.

At block 31 a route from a first geographical location to a second geographical location is obtained. The apparatus 1 may obtain information indicating a route 55 that has been determined from a first geographical location to a second geographical location. The geographical locations may be any real world locations. The route 55 may comprise a path over which the user of the apparatus 1 may travel between the two geographical locations.

In some embodiments the first geographical location may correspond to the location of the apparatus 1 when the route 55 is obtained. The location of the apparatus 1 may be determined using a navigation or positioning system such as GPS, enhanced GPS or any other suitable positioning system. In other embodiments the user may be able to input information using the user input device 17 to identify the first geographical location. For example, the user may use the user input device 17 to enter or select an address, a postal or zip code, or the name of a landmark or any other information which may be used to identify a geographical location.

The second geographical location may correspond to a location that has been identified by a user using the user input device 17. For example, the second geographical location may correspond to an intended destination of the user. The user may use the user input device 17 to enter or select an address, a postal or zip code, or the name of a landmark or any other information which may be used to identify the second geographical location.

In some embodiments the apparatus 1 may obtain the route 55 by using the controller 4 to determine the route 55. The route 55 may be determined using a navigation system such as GPS or other suitable positioning system. In some embodiments of the disclosure the apparatus 1 may be configured to obtain location information from a navigation system such as GPS and use this to determine a route 55. For example, the GPS system may be used to determine the current location of the apparatus 1.

In other embodiments of the disclosure the route 55 may be determined by a remote server or other apparatus and then provided to the apparatus 1. In such embodiments information indicative of the first geographical location and the second geographical location may be transmitted to the remote server or apparatus via the transceiver 19 and information indicating one or more routes 55 between the two geographical locations may be received in response.

The route 55 may be determined according to preferences specified by the user of the apparatus 1. For example the user may specify their mode of transport, whether they are walking, driving or using public transport or any other mode of transport. The user may also specify other preferences, for example they may specify intermediate points on the route or request to avoid certain features such as toll roads, if they are driving, or steps, if they are walking.

In some embodiments of the disclosure the route 55 that is determined may be dependent upon other criteria such as the time of day. For example, the route 55 may be selected to avoid certain roads if they are known to be busy or congested at particular times of the day. This may be useful for users of the apparatus 1 who may be driving. For users of the apparatus 1 who may be walking the route 55 may be selected to avoid pathways that do not have street lighting during night time.

Therefore in embodiments of the disclosure different users of the apparatus 1 may be provided with different routes between the same two geographical locations depending upon the preferences that they may have specified and other criteria such as the time of day.

The route 55 may be obtained in response to a user input. For example, the user may use the user input device 17 to indicate that they wish a route 55 to be determined. In some embodiments of the disclosure the route 55 may be obtained in response to the input or selection of the second geographical location.

At block 33 of FIG. 3A the controller 4 of the apparatus 1 controls the display 15 to display a graphical representation 65 of at least one point of interest along the route 55.

In some embodiments of the disclosure the graphical representation 65 of the at least one point of interest may be displayed in response to a user input selecting the graphical representation. For example, in some embodiments the user may be able to control the apparatus 1 to switch between displaying graphical representations 65 of points of interest and other information such as a map 49.

In some exemplary embodiments of the disclosure when the route 55 is determined the apparatus 1 may also obtain information relating to points of interest. The points of interest may be positioned along or near to route 55 so that the user of the apparatus 1 would be likely to see the point of interest as they travel along the route 55. The information which is obtained may comprise information which enables a graphical representation of the point of interest to be displayed on a display 15. The information may also comprise other information such as location information which may enable the location of the point of interest to be uniquely identified.

The points of interest may comprise any real world location or object that may be used to assist the user following the route 55. For example the points of interest may comprise manmade structures such as buildings, bridges or statues or monuments. In some embodiments the points of interest may comprise street furniture such as billboards or advertisement hoardings, post boxes, traffic lights or pedestrian crossings or any type of features that may be found in the street. In some embodiments the points of interest may comprise natural features such as a river or a hill.

In some embodiments a plurality of different points of interest may be identified. In such embodiments the processor 3 may be configured to select points of interest to use from the plurality of identified points of interest. The processor 3 may select the points of interest which are most relevant to the user of the apparatus 1. The processor 3 may use a weighting algorithm to determine which points of interest are most relevant to the user of the apparatus 1. In some embodiments the processor 3 may use information relating to previous activity by the user to determine which points of interest are most relevant to the user of the apparatus 1.

The graphical representation 65 of the point of interest may comprise any image that may be displayed on the display 15. The graphical representation 65 of the point of interest may be configured to enable a user to recognise the point of interest. In some exemplary embodiments the information relating to the points of interest may be used to enable the graphical representation 65 of the point of interest to be rendered. In some embodiments the graphical representation 65 of the point of interest may look similar enough to the real world point of interest so that the user can view the graphical representation 65 and then recognise and identify the real world item from the graphical representation 65. In some embodiments the graphical representation 65 of the point of interest may comprise a textual description of the point of interest to aid the user in identifying the point of interest.

In some embodiments of the disclosure the graphical representation 65 of the point of interest may be displayed in context within a graphical representation of its real world surroundings. This may assist the user in recognising the point of interest when they are travelling along the route.

In some embodiments of the disclosure the graphical representation 65 may comprise a photograph of the real world point of interest. The photograph may be, for example, a panoramic view of the point of interest. The panoramic view may be stored on a remote server and may be received by the apparatus 1 via the transceiver 19. In some embodiments the panoramic view may be received via a wireless data connection.

In some embodiments, when the graphical representation 65 of the point of interest is displayed, an identification of the point of interest may also be displayed. The controller 4 may control the display 15 to display an identification of the at least one point of interest. The identification of the at least one point of interest may enable a user to distinguish the graphical representation 65 from other information which may be displayed on the display 15 at the same time. For example the image comprising the graphical representation 65 of the point of interest may also comprise a plurality of other items such as buildings or landmarks. The identification which is displayed may be configured to enable the user to distinguish the point of interest from the other items in the image.

In some embodiments the identification may comprise displaying any items identified as a point of interest in a manner that distinguishes them from items that have not been identified as points of interest. For example the graphical representation 65 of the point of interest displayed on the display 15 may be graphically enhanced relative to other information which may be displayed on the display 15. The identification of points of interest may comprise a highlighted portion of the graphical representation which may cause the points of interest to be displayed in a different manner to other items on the display. For example the items that are identified as points of interest may be changed so that they are displayed more prominently than other items on the display. In some embodiments of the disclosure the identification of the points of interest may comprise displaying the items that are identified as points of interest in different colours to the other items displayed on the display 15. In some embodiments the identification of points of interest may comprise a boundary 67 that may be displayed around the graphical representation 65 of the point of interest to visually distinguish it from the other items that may also be displayed on the display 15. In some embodiments the controller 4 may be configured to control the sections of the display 15 in which the graphical representation of the point of interest is displayed to flash so that the visual representation changes, for example, the colours used or the brightness of the backlighting of the display 15 may be changed over a short period of time. It is to be appreciated that any other means of visually enhancing the graphical representation 65 of the point of interest may be used in other embodiments of the disclosure.

In some embodiments displaying an identification of a point of interest may comprise displaying a label 77 which may identify the point of interest. For example, the controller 4 may be configured to control the display 15 to display a label 77 identifying the graphical representation 65 of the point of interest. The label 77 may comprise any information that enables the point of interest to be identified.

At block 35 of FIG. 3A instructions 61 which enable the user to follow the route 55 from the first geographical location to the second geographical location may be provided. For example the controller 4 may control the apparatus 1 to provide instructions 61 which enable the user to follow the route 55 from the first geographical location to the second geographical location. The instructions 61 may comprise any information that enables the user to follow the path suggested from the first geographical location to the second geographical location.

In exemplary embodiments of the disclosure the instructions 61 may reference the points of interest that have been identified. For example the points of interest corresponding to the graphical representations that may be displayed on the display 15 may be referenced in the instructions 61 to enable the user to follow the instructions more easily. For example, a point of interest may be used to enable a user to identify when they should make a turning. In such examples the point of interest may be restaurant X and the instruction 61 may state "turn right at restaurant X". A point of interest may also be used to indicate which street the user should enter. In such examples the instruction may state "turn left into high street where you can see restaurant X". A point of interest may also be used to confirm to the user that they are still following the route 55 correctly. In such examples the instruction 61 may state "continue for 200 m passing restaurant X on your left". It is to be appreciated that any other suitable types of directions and instructions 61 may be provided which reference the points of interest. It is also to be appreciated that restaurant X has been used as an example and that the point of interest referred to in the instructions 61 could be any suitable point of interest.

In some embodiments the apparatus 1 may be configured to enable the instructions 61 to be displayed on the display 15. In such embodiments the graphical representation 65 of the point of interest may be displayed in a first portion 43 of the display 15 and the instructions 61 may be displayed in the second portion 45 of the display 15. This may enable the graphical representation 65 of the point of interest and the instructions 61 to be displayed simultaneously. This may make it easier for the user of the apparatus 1 to identify the points of interest referenced in the instructions and so may make it easier for the user to follow the route.

In some embodiments the instructions may be provided using a different output such as an audio output. The audio outputs may be provided instead of, or in addition to, the instructions 61 displayed on the display 15. For example the apparatus 1 may be coupled to an audio output device such as a loudspeaker or earphones that enables the user to hear the instructions. This may enable the user to be provided with the instructions without having to look at the apparatus 1. This may be useful when the user is travelling as they may have to concentrate on their surroundings rather than the apparatus 1.

Figure 3B:
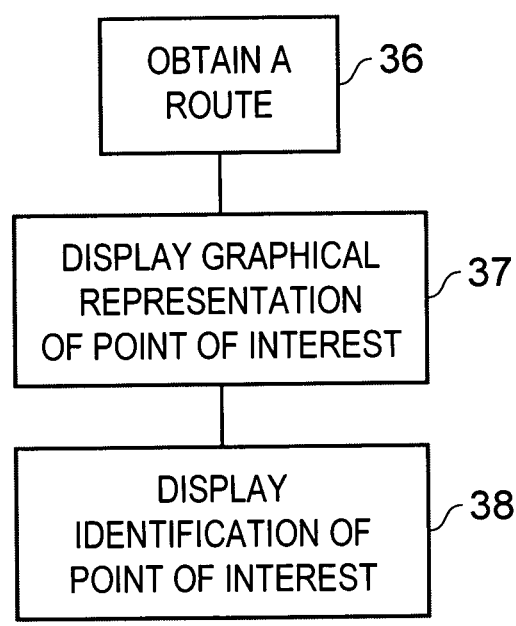

FIG. 3B is a block diagram that schematically illustrates another method according to an embodiment of the disclosure. The method may also be implemented by an apparatus such as the apparatus 1 illustrated in FIG. 1 or the apparatus 1' illustrated in FIG. 2 and in some embodiments the graphical user interfaces illustrated in FIGS. 4A to 4D may be used.

The method illustrated in FIG. 3B comprises; obtaining at block 36, a route from a first geographical location to a second geographical location and displaying, at block 37, a graphical representation of at least one point of interest along the route. The graphical representation of the at least one point of interest may be configured to enable a user to recognise the point of interest corresponding to the graphical representation of the at least one point of interest. The method illustrated in FIG. 3B also comprises displaying, at block 38, an identification of the at least one point of interest.

The blocks illustrated in FIGS. 3A and 3B may represent steps in a method and/or sections of code in the computer program code 9. The illustration of a particular order to the blocks does not necessarily imply that there is a required or preferred order for the blocks and the order and arrangement of the block may be varied. For example in FIG. 3A block 35 follows block 33, however it is to be appreciated that these blocks may occur in any order, including simultaneously. Furthermore, it may be possible for some blocks to be omitted.

FIGS. 4A to 4D illustrate graphical user interfaces 41 according to an exemplary embodiment of the disclosure. The graphical user interfaces 41 may be displayed on the display 15 of the apparatus 1 illustrated in FIG. 1. In the exemplary embodiment of FIGS. 4A to 4D the display may be a touch sensitive display 15 which enables a user to select an item by actuating the area of the display 15 in which the item is displayed. The graphical user interfaces 41 may be used to implement the method illustrated in FIGS. 3A and 3B that are described above.

Figure 4A:
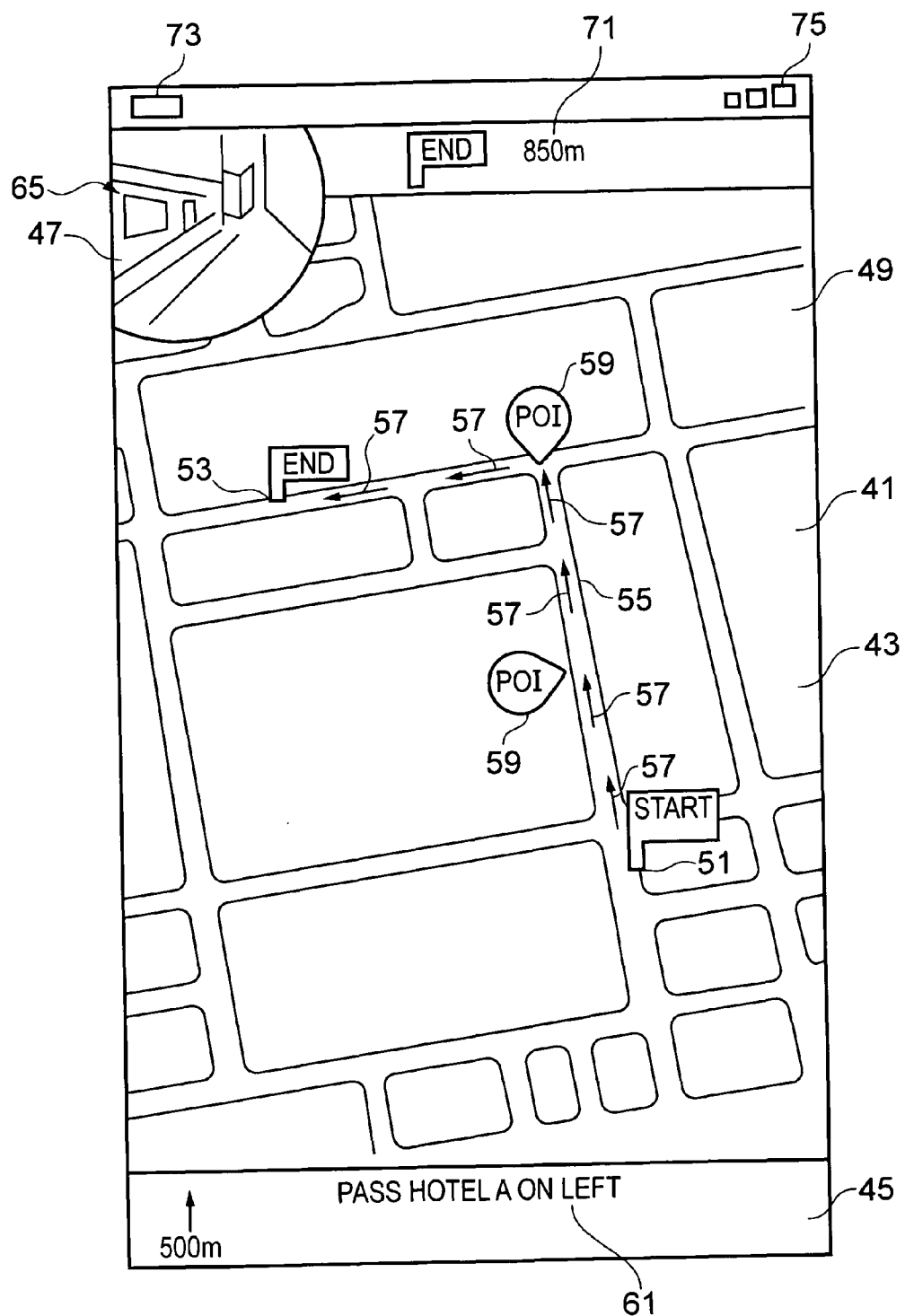
FIGS. 4A to 4D illustrate graphical user interfaces according to an exemplary embodiment.
Figure 4B:
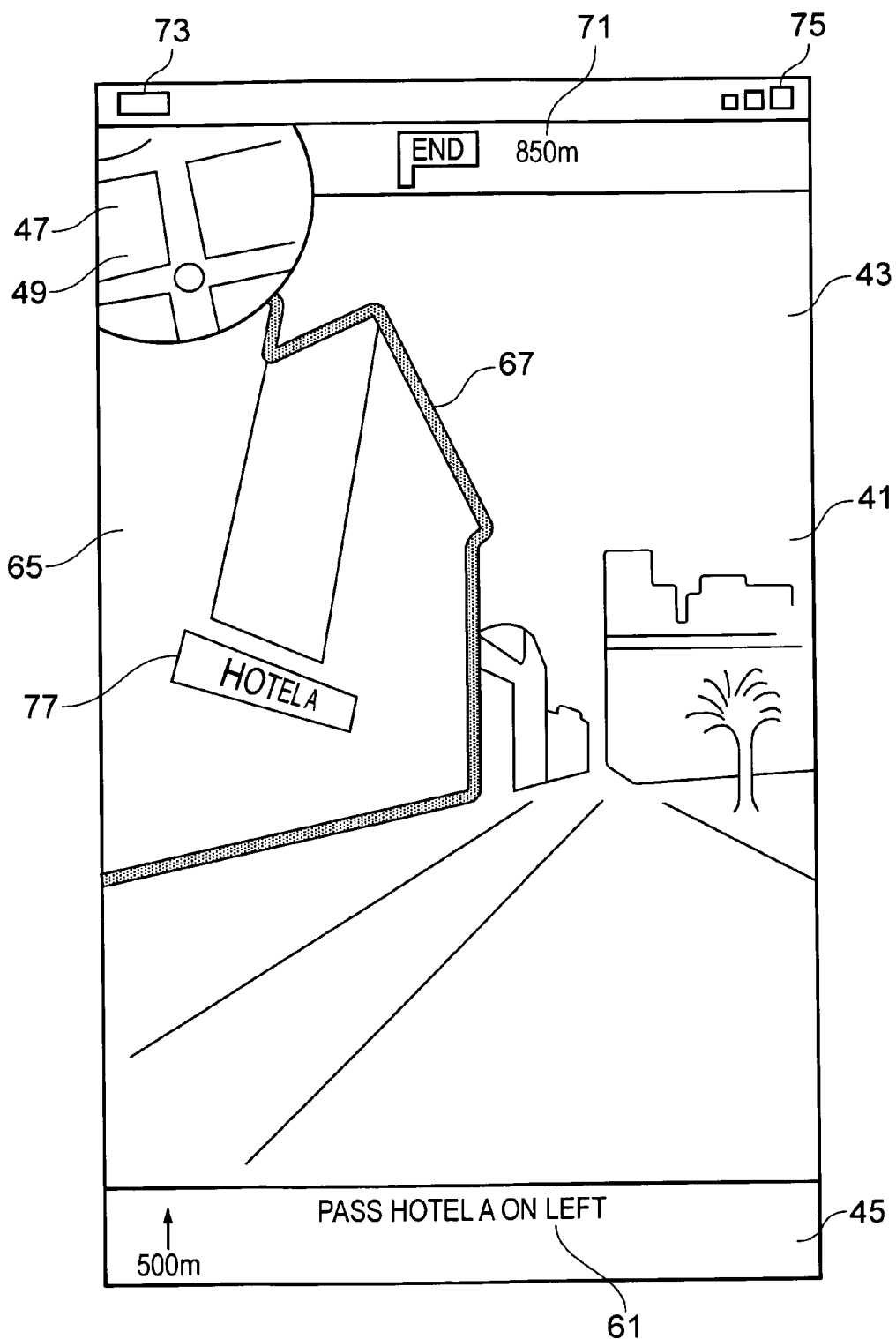

It is to be appreciated that the graphical user interfaces 41 have been illustrated schematically in FIGS. 4A to 4B and that in implementations of the disclosure images such as photographs may be used rather than schematic line drawings.

The graphical user interface 41 illustrated in FIG. 4A comprises a first portion 43, a second portion 45 and a third portion 47.

The first portion 43 of the graphical user interface 41 displays a map 49. The map 49 comprises an indication 51 of a first geographical location and an indication 53 of a second geographical location. In some embodiments the map 49 may be computed and created by a remote server and received by the apparatus 1 via a transceiver 19 so that the map 49 may be displayed on the display 15. In other embodiments the map 49 may be stored in the one or more memories 5 so that the processor 3 may retrieve the map 49 from the one or more memories 5 and cause the map 49 to be displayed on the display 15.

In the particular embodiment of the disclosure illustrated in FIGS. 4A to 4D the first geographical location corresponds to the current location of the apparatus 1. The indication 51 of a first geographical location therefore provides an indication of the current location of the apparatus 1. It is to be appreciated that in other embodiments other locations could be used as the first geographical location.

The second geographical location corresponds to a destination that has been identified by the user of the apparatus 1. In this particular embodiment the second geographical location comprises a cathedral that the user of the apparatus 1 wishes to visit. It is to be appreciated that any other location could be used as the second geographical location in other embodiments of the disclosure.

In the graphical user interface 41 illustrated in FIG. 4A a route 55 has been determined between the first geographical location and the second geographical location. The route 55 is indicated on the map 49 by the arrows 57. In other embodiments other means of indicating the route 55 may be used.

In the graphical user interface 41 illustrated in FIG. 4A information relating to points of interest along the route has also been obtained. Items 59 are displayed on the map 49 indicating the locations of points of interest. In some embodiments of the disclosure a point of interest may be provided for every part of the route 55 that involves a change of direction or any other point of the route 55 at which an instruction 61 is provided. The real world item that is chosen to be the point of interest may comprise any item that is easy for the user to recognise. In some embodiments of the disclosure the user may be able to indicate what kinds of items they find easier to use as points of interest, for example, they may find it easier to recognise shops or restaurants rather than buildings of historical interest. In other embodiments the point of interest may be determined to be the most visually distinctive item at the location where the direction is given.

The item 59 may be a user selectable item. In response to user selection of the item 59 the controller 4 may control the apparatus 1 to display a graphical representation 65 of the point of interest on the display 15. An identification of the point of interest may also be displayed. The identification of the point of interest may enable the user to recognise the point of interest when they are following the route 55. This may assist the user in following the directions correctly.

In the exemplary embodiments of FIGS. 4A to 4D, the second portion 45 of the graphical user interface 41 may be configured to display an instruction 61. The instruction 61 comprises information that assists the user of the apparatus 1 to follow the route 55.

The instruction 61 may include references to one or more points of interest. In this particular embodiment the instruction states "Pass hotel A on the left". The instruction 61 also comprises an arrow indicating the direction that the user of the apparatus 1 should travel in and also an indication of the distance that the user should continue in that direction for. It is to be appreciated that other information may be provided in other embodiments of the disclosure.

The third portion 47 of the graphical user interface 41 displays a graphical representation 65 of the point of interest that is referenced in the instruction 61. The graphical representation 65 may comprise an image such as a photograph. The photograph may be a panoramic view of the point of interest.

In the particular embodiments illustrated the first portion 43 of the display 15 is much larger than the third portion 47. In FIG. 4A the portion of the display 15 which is configured to display the map 49 is much larger than the portion which is configured to display the graphical representation 65 of the point of interest.

The graphical user interface 41 may also comprise other items that provide information to the user of the apparatus 1. For example there may be displayed an item 71 indicating the distance remaining until the user reaches the second geographical location. This item 71 may be updated as the user travels along the route 55. There may also be an item 73 indicating information such as the power remaining in a battery or other power supply device and an item 75 indicating the signal strength of a wireless communication link available to the apparatus 1. It is to be appreciated that in other embodiments of the disclosure other information may be provided to the user of the apparatus 1, for example, the current time, the estimated time of arrival of the user at the second geographical location, the speed at which the user is travelling or any other information.

FIG. 4B illustrates a second graphical user interface 41 according to the disclosure. The graphical user interface 41 illustrated in FIG. 4B also comprises a first portion 43, a second portion 45 and a third portion 47 corresponding to the portions illustrated in FIG. 4A. However in FIG. 4B the graphical representation 65 of the point of interest is now displayed in the first portion 43 and the map 49 is displayed in the third portion 47. Therefore in FIG. 4B the portion of the display 15 which is configured to display the graphical representation 65 of the point of interest is much larger than the portion which is configured to display the map 49.

The user of the apparatus 1 may be able to use the user input device 17 to control the apparatus 1 to switch between the two user interfaces illustrated in FIGS. 4A and 4B. For example the user may be able to switch between the two user interfaces 41 by actuating the third portion 47 of the display 15. This may enable the user to use whichever view they find most convenient.

In FIG. 4B the apparatus 1 is at the same location as the apparatus 1 in FIG. 4A so the user has switched between the two user interfaces but has not moved or changed the location of the apparatus 1. The instruction 61 which is displayed in the second portion 45 of the display 15 is the same in both FIG. 4A and FIG. 4B.

The graphical representation 65 of the point of interest is identified in FIG. 4B by a thick boundary 67 around the building corresponding to the point of interest, which in this example is hotel A. The graphical representation 65 of the point of interest also comprises a label 77 that correlates to the information in the instruction 61 and assists the user in following the instruction. This enables the user to easily identify which item in the image corresponds to the point of interest. It also enables the user to easily identify which item in the image corresponds to the point of interest that is referenced in the instruction 61. This may provide the user with confidence that they are following the instructions correctly.

The graphical representation 65 of the point of interest may be displayed from a perspective corresponding to the perspective that the user is likely to view the point of interest from when they are following the route 55. The perspective from which the user is likely to view the point of interest may be determined from information relating to the route 55 or the direction that the user should be travelling, the mode of transport which the user is using, the speed at which the user is travelling or any other suitable information. This may provide an indication of the direction at which the user would approach the point of interest and/or the distance of the user from the point of interest. This information may be used to determine the graphical representation 65 of the point of interest which is displayed so that the graphical representation 65 corresponds to the view of the point of interest that the user should have as they follow the route 55. This may enable the user to recognise the point of interest more easily.

The map 49 which is now displayed in the third portion 47 of the display comprises a section of the map 49 which was also displayed in the graphical user interface 41 illustrated in FIG. 4A. As the area available for the display of the map 49 is now much smaller only a portion of the map 49 is displayed in the graphical user interface 41 of FIG. 4B.

Figure 4C:
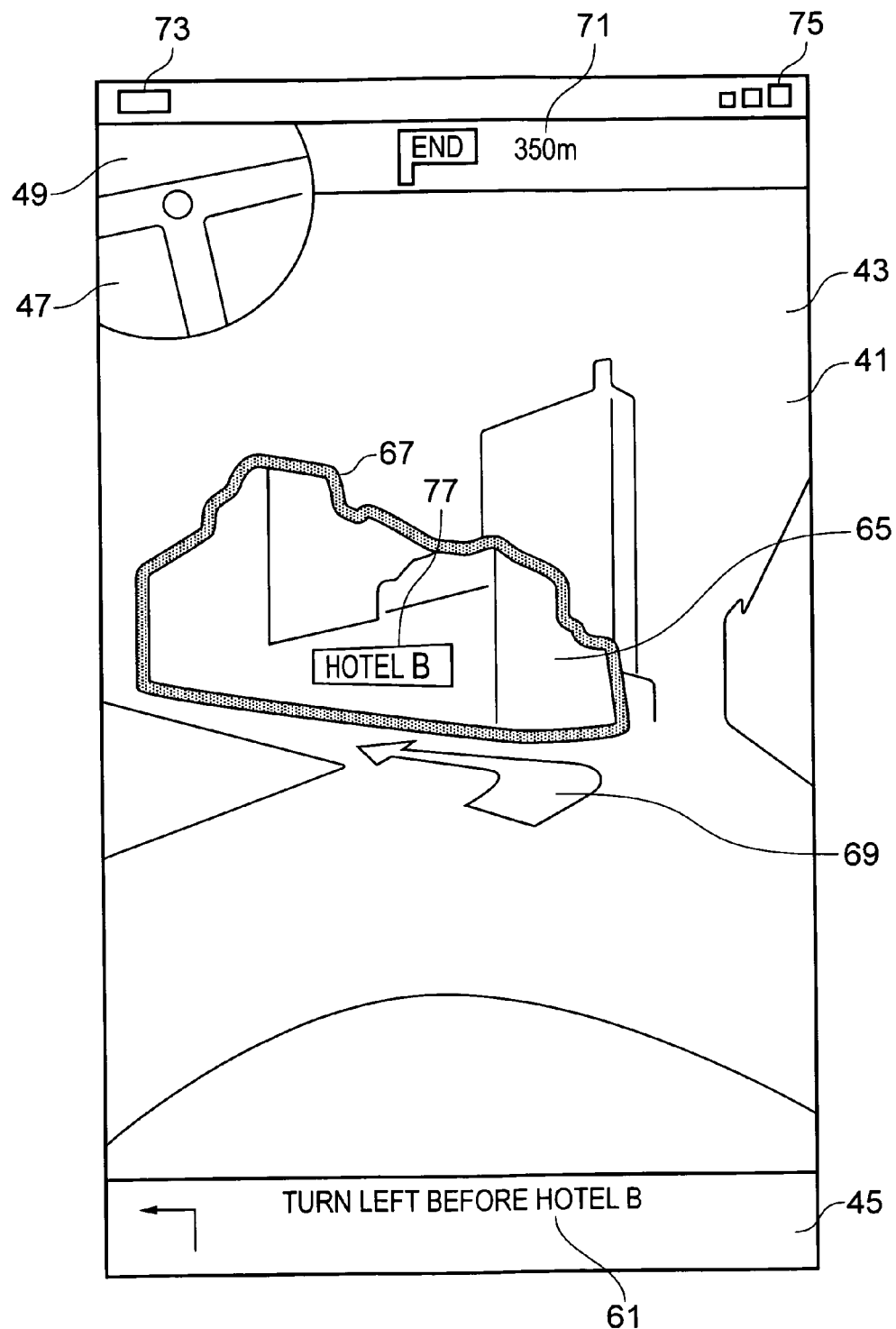

FIG. 4C illustrates a third graphical user interface 41 according to the disclosure. In the graphical user interface 41 illustrated in FIG. 4C the user has travelled along the route 55 so that they are now approaching the point where they need to turn the corner.

The instruction 61 that is displayed in the second portion 45 of the display 15 now states "turn left before hotel B". The first portion 43 of the display 15 has been updated to display a graphical representation 65 of the point of interest that is referenced in this new instruction. In this example, the point of interest is now hotel B.

As in FIG. 4B the graphical representation 65 of the point of interest, hotel B, is identified by a thick boundary 67 around the building corresponding to hotel B in the image. The graphical representation 65 of the point of interest also comprises a label 77 that identifies the point interest as hotel B and correlates the image with the instructions which have been provided.

The image displayed in the first portion 43 also comprises an arrow 69. The arrow provides further instruction to the user of the apparatus 1 and makes it clear whether the user should make the left turn before the point of interest or after the point of interest.

In the example embodiment of FIG. 4C the third portion 47 of the display 15 has also been updated to show the portion of the map 49 at which the user should make the left turn in accordance with the instructions.

Figure 4D:
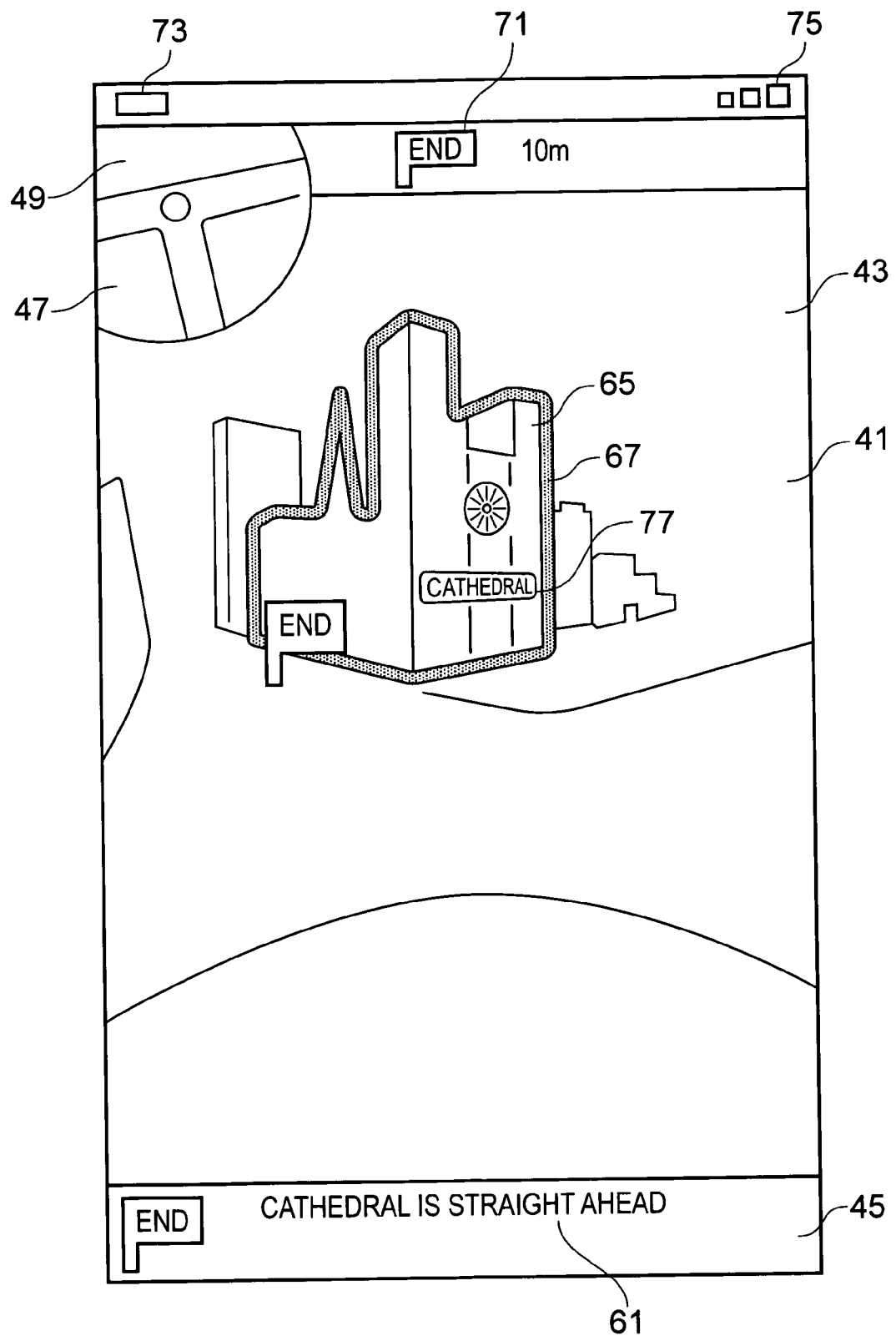

FIG. 4D illustrates a fourth graphical user interface 41 according to the disclosure. In the graphical user interface 41 illustrated in FIG. 4D the user has travelled along the route 55 so that they have almost completed the route and are now approaching the second geographical location.

The instruction 61 that is displayed in the second portion 45 of the display 15 now states "Cathedral straight ahead". The first portion 43 of the display 15 has been updated to display a graphical representation 65 of the second geographical location that, in this example, is the cathedral.

As in FIGS. 4A and 4B the graphical representation 65 is identified by a thick boundary 67 around the building corresponding to cathedral in the image. The graphical representation 65 also comprises a label 77 that identifies the building as the cathedral.

In the example embodiment of FIG. 4D the third portion 47 of the display 15 has also been updated to show the portion of the map 49 corresponding to the second geographical location.

Embodiments of the disclosure provide for an improved method of providing a user with information to enable them to travel from a first geographical location to a second geographical location. Providing references to a point of interest in the instructions may make the instructions easier for a user to understand and follow. For example the instruction "turn left at hotel B" may be much easier for a person to understand than "turn left in 500 meters". A user can easily see and recognise hotel B but they might not be able to judge when they have travelled 500 meters.

Embodiments of the disclosure may be advantageous for pedestrian users. Such users may be travelling at a slower speed than users in a vehicle and so may be able to pay more attention to points of interest as they are travelling. Furthermore a pedestrian may be able to stop walking and refer back to the instructions and images on the display as many times as they need to as they are not restricted by the movement of traffic or traffic regulations. This may enable the user to stop when they think they have reached the point of interest and compare the real world point of interest with the graphical representation on the display to check that they are following the directions correctly. Also pedestrians might not have any method to measure distances or determine compass directions therefore such users may find instructions referring to points of interest more useful than instructions referring to distances and compass directions.

Furthermore embodiments of the disclosure correlate the instructions comprising a reference to a point of interest to a graphical representation of the point of interest. For example, the instruction and a graphical representation of the point of interest may be displayed simultaneously. The graphical representation of the point of interest may be identified so that the user can easily determine which item in the image corresponds to the point of interest. For example, a boundary may be provided around the graphical representation of the point of interest or the graphical representation of the point of interest may be displayed in a different colour. This may enable the user easily to identify the point of interest.

The graphical representation of the point of interest may enable the user to follow the directions more easily and provide the user with confidence that they are making turns at the correct point and that they are following the instructions properly and may enable them to recognise when they have reached their destination.

Also the combination of the images and the instructions may enable the user to follow the instructions without having to keep referring back to the apparatus. For example, if the user is provided with the instruction "turn left at hotel B" then they will not need to refer back to the apparatus until they have reached hotel B and have turned left and are ready for the next instruction. Conversely if the instruction merely stated "turn left in 500 meters" then the user may have to keep referring back to the apparatus to determine when they have travelled 500 meters. It may be particularly beneficial to reduce the amount that a user has to look at the apparatus 1 when they are driving or walking as it enables the user to pay more attention to their surroundings.

Figure 5:
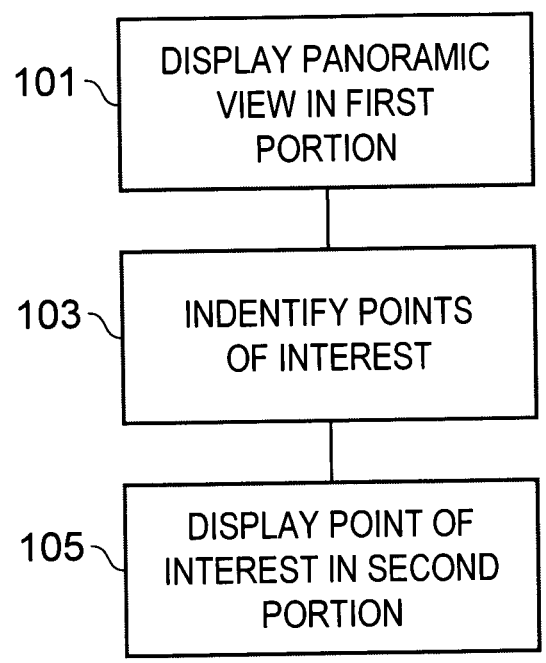
FIG. 5 illustrates a method according to an exemplary embodiment.

FIG. 5 illustrates a method according to another embodiment of the disclosure. The method illustrated in FIG. 5 may be implemented using an apparatus 1 as illustrated in FIG. 1 and described above. The method of FIG. 5 may be incorporated to the methods and embodiments described above.

At block 101 the processor 3 may control the display 15 to display a perspective view of a geographic location. The perspective view may be displayed at a first scale. The perspective view may be a graphical representation of a real world geographic location. The perspective view may comprise a perspective view of the geographic location. The perspective view may be a continuous view of a portion of a geographic location. In some embodiments of the disclosure the perspective view may comprise a photograph of the real world geographic location. In some exemplary embodiments of the disclosure the perspective view may comprise a map or a section of a map. In other embodiments a map may be displayed in addition to the perspective view.

In some embodiments of the disclosure the perspective view may comprise images which are captured by the apparatus 1. The images may be captured prior to the method being performed. The captured images may be stored in the one or more memories 5 of the apparatus 1.

The images may be captured while the method is being performed so that the perspective view comprises an instantaneous view of the location of the user of the apparatus 1. For example, the perspective view may be used to provide an augmented reality to a user.

The perspective view may be displayed in a first region of the display 15. The display 15 may also be configured to display a boundary demarcating the first region.

At block 103 a point of interest is identified. The point of interest may be associated with the geographic location which is represented by the perspective view. In some embodiments of the disclosure the point of interest may be a point of interest which is displayed in the perspective view which is displayed at block 103 In other embodiments of the disclosure the point of interest may be located in a region near the geographic location which is represented by the perspective view but might not be visible in the displayed perspective view.

In some embodiments of the disclosure the point of interest may comprise manmade structures such as buildings, bridges or statues or monuments. In some embodiments the points of interest may comprise street furniture such as billboards or advertisement hoardings, post boxes, traffic lights or pedestrian crossings or any type of features that may be found in the street.

In some embodiments of the disclosure the point of interest may comprise one or more alphanumeric characters. The alphanumeric characters may form text portions. The text portion may comprise, for example, a sign indicating a shop or other business, a road sign indicating a place name or any other suitable portion of text.

In some embodiments of the disclosure identifying the point of interest may comprise selecting a point of interest from a plurality of available points of interest. For example, there may be a plurality of points of interest displayed in the perspective view. In some embodiments the processor may be configured to select one or more of the displayed points of interest. In some embodiments of the disclosure there may be a plurality of points of interest within a predetermined distance from the geographic location corresponding to the displayed perspective view. In such embodiments the processor 3 may be configured to select one or more of the points of interest within a predetermined distance from the geographic location.

In some embodiments of the disclosure the processor 3 may be configured to identify a point of interest which is relevant to the user of the apparatus 1. In some embodiments a weighting algorithm may be used to enable the processor to identify the points of interest which are most relevant to the user of the apparatus 1. The weighting algorithm may comprise each available point of interest being assigned a value based on characteristics of the point of interest. The most relevant point of interest may be determined to be the point of interest with the highest weighting value.

The characteristics of the point of interest which may be used in the weighting algorithm may include the size of the point of interest, the distance between the user and the point of interest, the shape or visual distinctiveness of the point of interest, whether or not the user has had activity associated with the point of interest or similar point of interest previously or any other suitable characteristic. Activity associated with the point of interest or a similar point of interest may comprise, visiting the point of interest or similar point of interest, accessing information, such as a website, related to the point of interest or similar point of interest or any other suitable activity. The user may have used the apparatus 1 to carry out the activity, for example they may have used the apparatus 1 to access websites associated with a point of interest.

As an example the point of interest may comprise a sign for a coffee shop or a building in which a coffee shop is located. The user may have visited coffee shops previously or may have accessed websites looking for coffee shops, or may subscribe to news feeds from coffee shops via social networking applications. In such embodiments it may be recognised that the user may have an interest in coffee shops and so the coffee shop may be awarded a higher weighting value than other types of shops.

At block 105 the identified point of interest may be displayed at a second scale in a second region of the display 15. The second region of the display 15 may be displayed adjacent to the first region of the display 15. The display 15 may also be configured to display a boundary demarcating the first region.

The second scale may be larger than the first scale. The second scale may be such that information is visible in the second portion which is not visible in the first portion.

In some embodiments of the disclosure the point of interest may be displayed at a second scale in a second region of the display 15 whenever the user is within a predetermined distance of a point of interest. In some embodiments the point of interest may be displayed at a second scale in a second region of the display 15 in response to a user input. In some embodiments the point of interest may be displayed at a second scale in a second region of the display 15 as part of a sequence of instructions which may enable a user to follow a route.

In some embodiments of the disclosure an indicator may be displayed which indicates where the point of interest is located relative to the displayed perspective view. The indicator may be, for example, an arrow or other visual marker which indicates the relative position of the point of interest within the perspective view.

Figure 6:
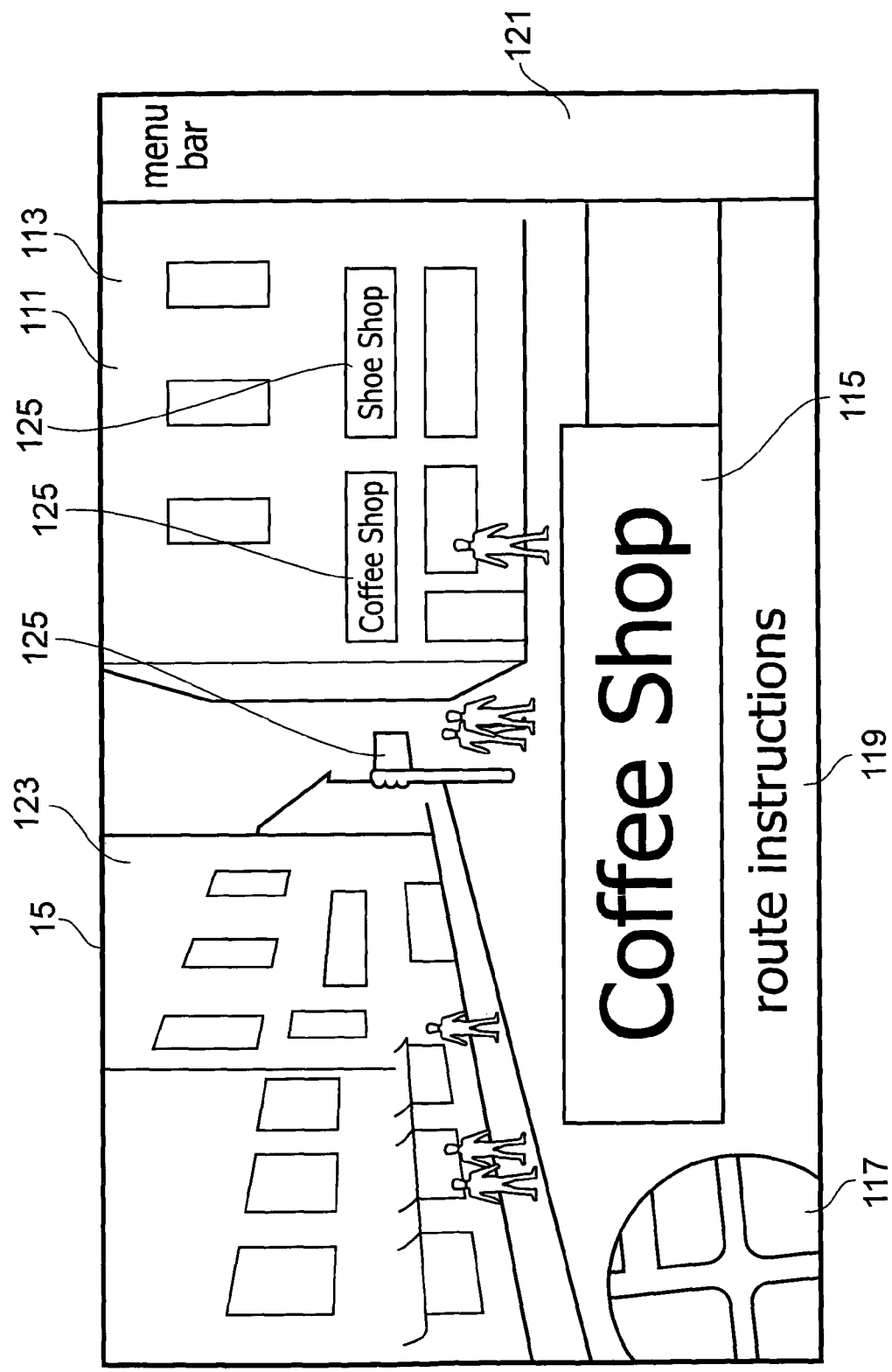
FIG. 6 illustrate a graphical user interface according to an exemplary embodiment.

FIG. 6 illustrates a graphical user interface 111 which may be used in methods described above in relation to FIG. 5. The graphical user interface 111 may be displayed on the display 15 of an apparatus 1 as illustrated in FIG. 1 and described above.

The display 15 comprises a first portion 113 and a second portion 115. In the exemplary embodiment of FIG. 6 there is also provided a third portion 117, a fourth portion 119 and a fifth portion 121. In some embodiments of the disclosure the respective portions may be displayed simultaneously. In the exemplary embodiment of FIG. 6 the second, third, fourth and fifth portions are located around the edge of the display 15. In other embodiments of the disclosure the respective portions may be located in different locations.

In the exemplary embodiment illustrated in FIG. 6 the first portion 113 is the largest portion. The first portion 113 comprises most of the display 15. In some embodiments the respective portions may have different sizes or proportional sizes. For example, the embodiment illustrated in FIG. 6 the second portion 115 is much smaller than the first portion 113. In other embodiments the second portion 115 may be the same size or approximately the same size as the first portion 113. In such embodiments each of the first portion 113 and the second portion 115 may take up half or approximately half of the display 15. In some embodiments of the disclosure a user may be able to change the sizes of the respective portions.

A perspective view 123 is displayed in the first portion 113 of the display 15. The perspective view, may be, for example, a photograph of a street or other real world geographic location. The geographic location may be a user's current location which may be determined using a positioning device. In some embodiments the geographic location may be a geographic location which the user has indicated they are interested in.

The perspective view 123 illustrated in FIG. 6 comprises a plurality of points of interest 125. In this exemplary embodiment the points of interest 125 may be street signs or signs of shops. In other embodiments of the disclosure the points of interest may comprise any other item which may be of interest to a user.

The perspective view 123 in the first portion is displayed at a first scale. The first scale may be such that a user cannot view the detail of the points of interest 125. For example, any writing or text or alphanumeric characters in the points of interest may be too small for a user to read or read easily.

In the exemplary embodiment of FIG. 6 a point of interest 125 is displayed in the second portion 115. The point of interest 125 may be displayed at a second scale which may be larger than the first scale. This may enable a user to easily identify the point of interest 125. For example it may enable a user to read any text or recognise any alphanumeric characters in the point of interest 125.

In the exemplary embodiment of FIG. 6 only one point of interest 125 is displayed in the second portion. The processor 3 may have selected the point of interest to be displayed using a weighting algorithm as described above. For example, the coffee shop is positioned adjacent to a shoe shop. However the processor 3 may determine that the user has more activity related to coffee shops than shoe shops and so may determine that the coffee shop is a more relevant point of interest 125 than a shoe shop.

In the exemplary embodiment of FIG. 6 a map may be displayed in the third portion 117 of the display 15. The map may provide an indication of the geographical location of the perspective view and the points of interest 125.

Also in the exemplary embodiment of FIG. 6 information such as route instructions 119 may be displayed in the fourth portion of the display 15. The route instructions may contain references to the points of interest 125 as described above in relation to FIGS. 1 to 4.

In the exemplary embodiment of FIG. 6 a menu bar is displayed in the fifth portion 121. The menu bar may comprise user selectable icons which may enable a user to access functions of the apparatus 1 or exit the current function.

In other embodiments of the disclosure other portions may be displayed which may provide other functions to the user.

Embodiments of the invention enable a perspective view 123 and a point of interest 125 associated with a perspective view 123 to be displayed simultaneously. This may enable a user to view the details of the point of interest 125 simultaneously to viewing the context of the perspective view. This may enable the user to view the details of the point of interest 125 without having to zoom in on the perspective view as zooming in may lose the context of the view.

The displayed point of interest 125 may be used to provide route instructions or enable a user to determine their own location. In some embodiments the point of interest which is most relevant to a user may be displayed. This may make the apparatus 1 personalised for a user. It may also make it easier for a user to identify the points of interest as they may be provided with information which they are interested in.

Although embodiments of the present disclosure have been described in the preceding paragraphs with reference to various examples, it should be appreciated that modifications to the examples given can be made without departing from the scope of the disclosure as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the disclosure believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   at least one processor; and
   at least one non-transitory memory including computer program code;
   wherein the at least one non-transitory memory and the computer program code are configured to, with the at least one processor, enable the apparatus to:
   display a perspective view of a geographical location at a first scale in a first region of a display;
   identify a point of interest associated with the geographical location and display a perspective view of the identified point of interest at the first scale in the first region of the display; and
   simultaneously display the identified point of interest at a second scale in a second region of the display.

2. An apparatus as claimed in claim 1 wherein identifying a point of interest comprises selecting a point of interest from a plurality of available points of interest.

3. An apparatus as claimed in claim 1 wherein identifying the point of interest comprises using a weighting algorithm to determine a point of interest relevant to a user of the apparatus.

4. An apparatus as claimed in claim 3 wherein the weighting algorithm uses previous activity by the user of the apparatus to determine a point of interest relevant to a user of the apparatus.

5. An apparatus as claimed in claim 1 wherein the point of interest is identified automatically.

6. An apparatus as claimed in claim 1 wherein the point of interest comprises at least one alphanumeric character.

7. An apparatus as claimed in claim 1 wherein the second scale is larger than the first scale.

8. An apparatus as claimed in claim 1 wherein the identified point of interest is displayed in perspective view of a geographical location at a first scale in a first region of a display and at a second scale in a second region of the display.

9. An apparatus as claimed in claim 1 wherein an indicator is displayed to indicate the location of the identified point of interest relative to the perspective view.

10. A method comprising:
    displaying, by an apparatus, a perspective view of a geographical location at a first scale in a first region of a display;
    identifying, by the apparatus, a point of interest associated with the geographical location and displaying a perspective view of the identified point of interest at the first scale in the first region of the display; and
    simultaneously displaying by the apparatus, the identified point of interest at a second scale in a second region of the display.

11. A method as claimed in claim 10 wherein identifying a point of interest comprises selecting a point of interest from a plurality of available points of interest.

12. A method as claimed in claim 10 wherein identifying the point of interest comprises using a weighting algorithm to determine a point of interest relevant to a user of the display.

13. A method as claimed in claim 12 wherein the weighting algorithm uses previous activity by the user of the apparatus to determine a point of interest relevant to a user of the display.

14. A method as claimed in claim 10 wherein the point of interest is identified automatically by the apparatus.

15. A method as claimed in claim 10 wherein the point of interest being displayed comprises at least one alphanumeric character.

16. A method as claimed in claim 10 wherein the apparatus displays the second scale is larger than the first scale.

17. A method as claimed in claim 10 wherein the identified point of interest is displayed in perspective view of a geographical location at a first scale in a first region of a display and at a second scale in a second region of the display.

18. A method as claimed in claim 10 wherein an indicator is displayed to indicate the location of the identified point of interest relative to the perspective view.

19. A non-transitory physical entity embodying a computer program comprising computer program instructions that, when executed by at least one processor, cause an apparatus at least to perform:
    displaying a perspective view of a geographical location at a first scale in a first region of a display;
    identifying a point of interest associated with the geographical location and displaying a perspective view of the identified point of interest at the first scale in the first region of the display; and
    simultaneously displaying the identified point of interest at a second scale in a second region of the display.

20. A physical entity embodying a computer program comprising program instructions for causing a computer to perform the method of claim 10.

* * * * *